United States Patent [19]

Luperti et al.

[11] 4,097,145
[45] Jun. 27, 1978

[54] MEANS FOR SELF-POSITIONING PLATEN COVERS

[75] Inventors: Harry E. Luperti, Wilton; Robert E. Manna, Newtown, both of Conn.

[73] Assignee: Pitney-Bowes, Inc., Stamford, Conn.

[21] Appl. No.: 756,348

[22] Filed: Jan. 3, 1977

[51] Int. Cl.² .............................................. G03B 27/62
[52] U.S. Cl. ..................................... 355/75; 220/264; 220/335; 355/25
[58] Field of Search ....................... 355/75, 76, 25, 99, 355/82, 93, 130; 220/259, 264, 335; 271/DIG. 2, DIG. 4, 174, 197, 176

[56] References Cited

U.S. PATENT DOCUMENTS

| | | | |
|---|---|---|---|
| 3,642,371 | 2/1972 | Jones et al. | 355/82 X |
| 3,994,582 | 11/1976 | Goshima et al. | 355/75 |
| 3,997,265 | 12/1976 | Menon et al. | 355/75 |
| 4,033,694 | 7/1977 | Ferrari | 355/76 |

Primary Examiner—Richard A. Wintercorn
Attorney, Agent, or Firm—Donald P. Walker; William D. Soltow, Jr.; Albert W. Scribner

[57] ABSTRACT

Self-positioning apparatus for a platen covering device is provided for a copier of the type which includes a platen, instrumentalities for flash illuminating a document placed by an operator on the platen, and a platen covering device such as a document feeder or a flat, opaque sheet of material or the like. The apparatus includes a linkage assembly for movably supporting the platen covering device; a manually releasable latch for holding the covering device at a predetermined position for holding respective documents of minimal thickness in contact with the platen; and resilient means including at least one torsion bar for urging the covering device away from said predetermined position, when said latch is released, for holding respective documents of greater thickness in contact with said platen.

12 Claims, 4 Drawing Figures

U.S. Patent  June 27, 1978  Sheet 1 of 2  4,097,145
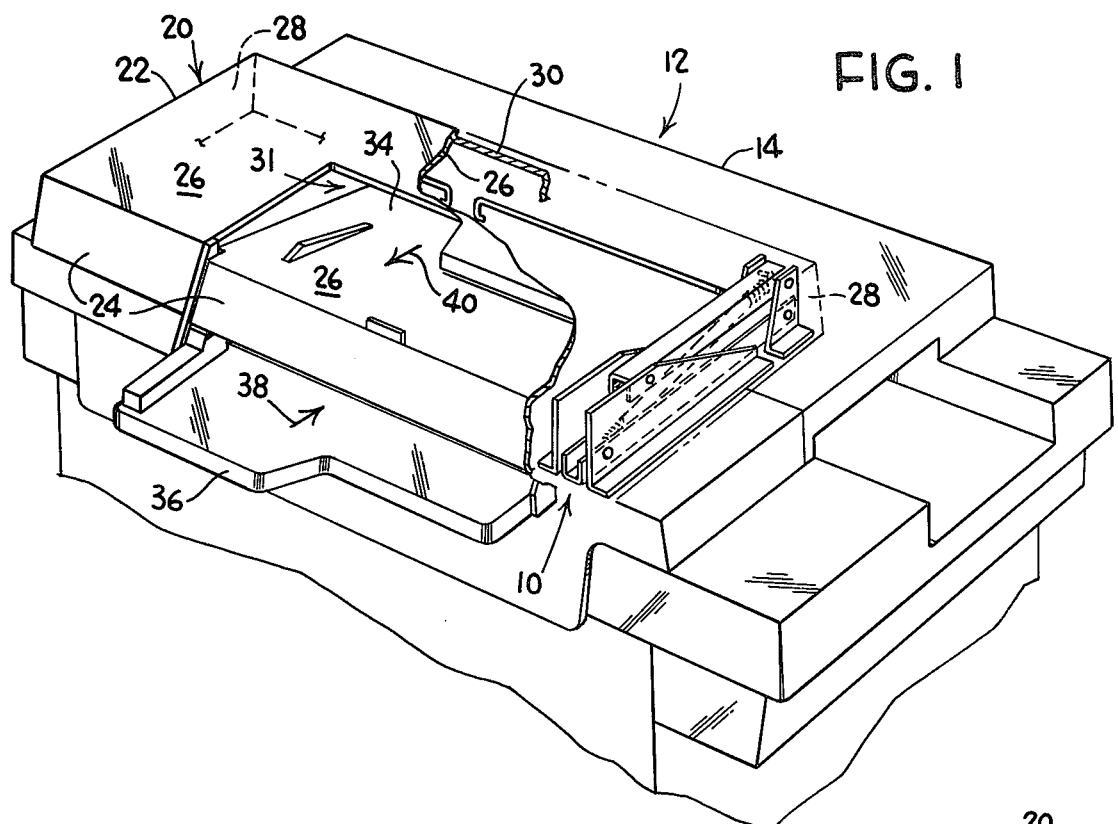
FIG. 1
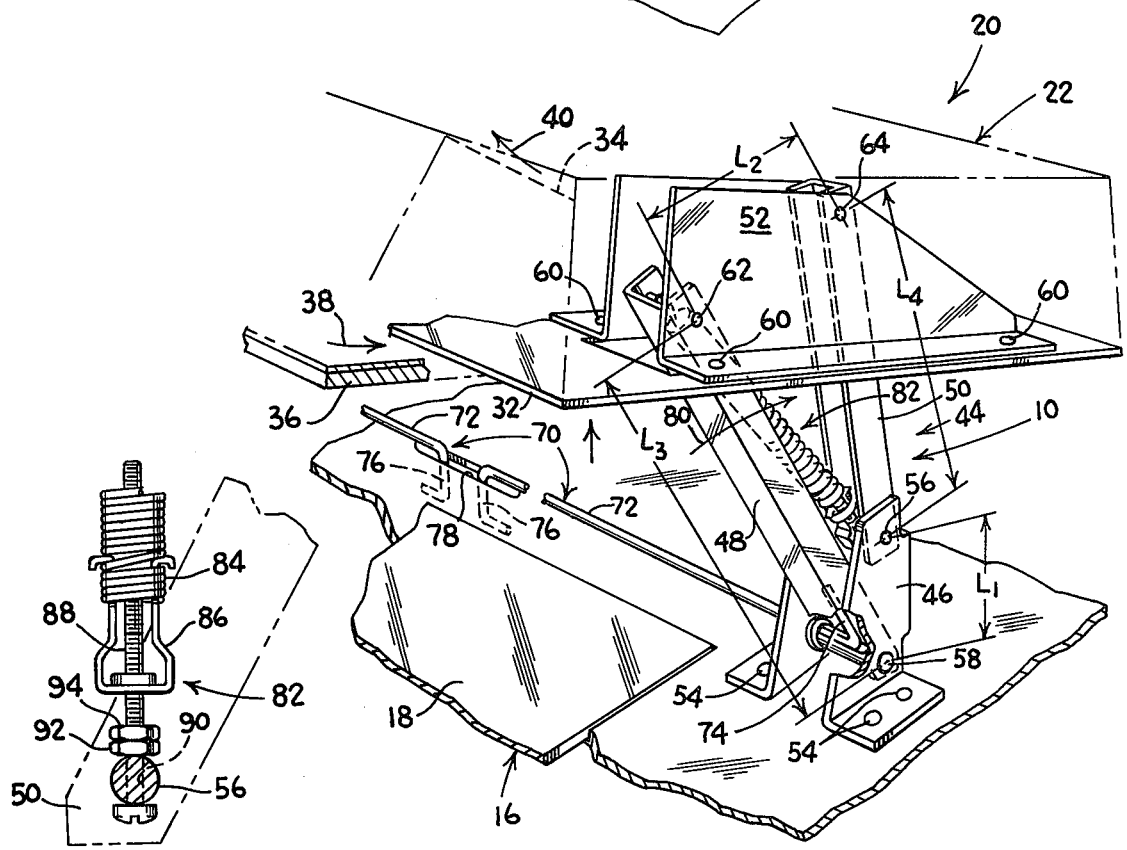
FIG. 4
FIG. 3

MEANS FOR SELF-POSITIONING PLATEN COVERS

BACKGROUND OF THE INVENTION

Commercially available electrostatic copying machines, or copiers, generally include processing instrumentalities for forming and developing an electrostatic latent image on a moving photoreceptor and thereafter transferring the developed image from the photoreceptor to a copy sheet made of a suitable material such as paper.

As shown in U.S. Pat. No. 3,998,542 issued Dec. 21, 1976 to John A. Toto et al, many of such copiers are provided with well-known means for flash illuminating a document placed by the operator at the copier's document illuminating station, typically a glass platen, to expose the photoreceptor with light modulated by graphic information on the document. Whereupon, the photoreceptor selectively conducts to form the electrostatic latent image on the photoreceptor. The intensity of the light utilized for flash illumination is so great that a given document can be sufficiently illuminated for copying purposes in a time period of 10 milliseconds or less. To avoid exposing the photoreceptor to ambient light when a document is not disposed on the glass platen, and to avoid exposing the operator's eyes to high intensity light when a document is being flash illuminated, copiers are provided with suitable means adapted to cover the glass whether or not the copier is being utilized for copying purposes.

In most instances the platen covering means takes the simple form of a manually movable, flat sheet of opaque material which is suitably pivotably attached to the copier. The cover not only covers the platen but functions to hold a document placed on the platen in intimate face-to-face contact therewith to facilitate obtaining high fidelity copies of the graphic information borne by the document. In other instances, as shown in U.S. Pat. No. 3,623,806, issued Nov. 30, 1971 to Short, the platen covering means takes the more complex form of a document feeder which, in addition to performing the platen covering and document holding functions, provides for feeding a given document to the platen for copying purposes, thereby permitting an operator to avoid the time consuming task of properly locating successive documents in place on the platen.

It is also generally known to equip at least the more simplified forms of platen covering means with various devices which permit the same to be raised above the platen by the operator to accommodate varying thicknesses of documents which are placed on the platen for copying purposes, thereby permitting the copier to be utilized for copying graphic information from such documents as magazines and books. Examples of such devices are shown in U.S. Pat. No. 3,630,620, issued Dec. 28, 1971 to Fackler; U.S. Pat. No. 3,888,585 issued June 10, 1975 to Cross and U.S. Pat. No. 3,989,376, issued Nov. 2, 1976 to Ravera et al.

On the other hand, although it is known to provide counterbalanced forms of self-positioning platen covers, as shown in U.S. Pat. No. 3,615,134, issued Oct. 26, 1971 to Newcomb, the prior art appears to be silent respecting the provision of a simply constructed form of means for self-positioning the various types of platen covering means for accommodating varying thicknesses of documents. Accordingly:

An object of the present invention is to provide a simplified form of means for self-positioning various types of platen covering means; and;

Another object is to provide a copier, of the type which includes a platen, with apparatus which self-positions the platen covering means thereof for accommodating different thicknesses of documents placed on the platen for copying purposes.

SUMMARY OF THE INVENTION

Apparatus for self-positioning the platen covering means of an electrostatic copying machine. The apparatus includes means for supporting the covering means; means for releasably holding the covering means at a predetermined level with respect to the platen to hold respective documents of minimal thickness in contact with the platen; and resilient means for elevating the covering means to respective levels above the platen to hold respective documents of greater thickness in contact with the platen.

BRIEF DESCRIPTION OF THE DRAWINGS

As shown in the drawings wherein like reference numerals designate like or corresponding parts throughout the several views:

FIG. 1 is a perspective view of a copier including means for self-positioning the platen covering means in accordance with the invention, and showing the covering means disposed at a predetermined position for holding respective documents of minimal thickness in contact with the platen;

FIG. 3 is an enlarged, fragmentary view, in perspective, of the self-positioning means of FIG. 1, showing the linkage means thereof for supporting the covering means, and the resilient means thereof for moving the linkage means to elevate the covering means out of the predetermined position shown in FIG. 1, so as to accommodate holding respective document of greater thickness in contact with the platen.

FIG. 4 is an enlarged, fragmentary view, in elevation, of means for adjusting the tension of the resilient means shown in FIG. 3.

DESCRIPTION OF THE PREFERRED EMBODIMENT

Figure 2:
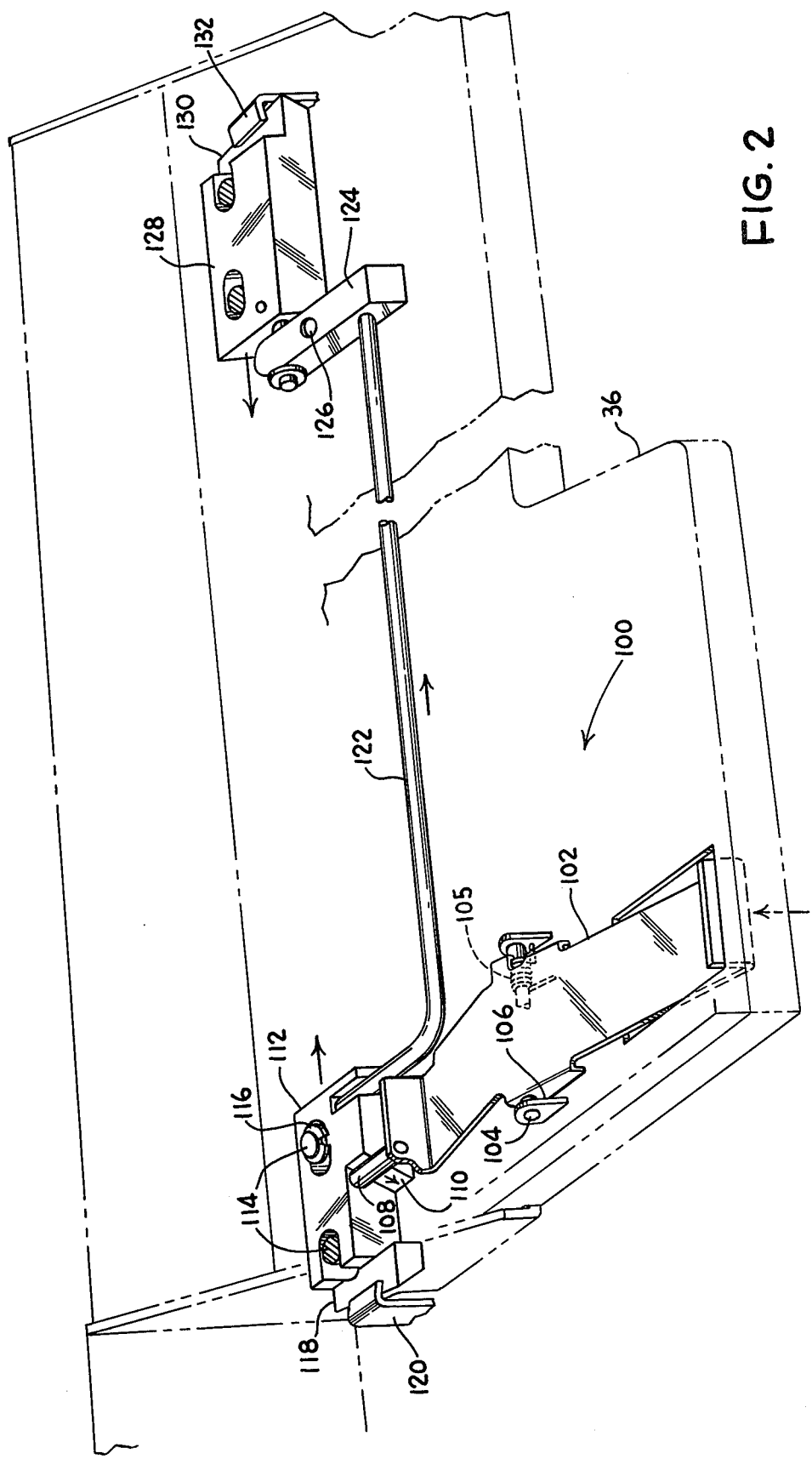
FIG. 2 is an enlarged, fragmentary view, in perspective, of the self-positioning means of FIG. 1, which shows the manually releasable latching means thereof for holding the platen covering means in the predetermined position shown in FIG. 1.

As shown in FIG. 1, the self-positioning means 10, in accordance with the present invention, is mounted on a copier 12 which comprises suitable framework 14 for supporting the various instrumentalities of the copier 12, including a glass platen 16 (FIG. 3) having an upper surface 18 on which an operator ordinarily places a document (not shown), having graphic information to be copied, in face-to-face contact. The copier 12 additionally includes such instrumentalities as a suitable photoreceptor (not shown) and suitable electro-optical means (not shown) for flash illuminating respective documents through the glass platen 16 to expose the photoreceptor with the graphic information borne by respective documents.

The copier 12 shown in FIG. 1 also includes the platen covering apparatus with which the self-positioning means 10 is preferably combined, namely, a suitable document feeder 20. The document feeder 20 includes a housing 22 having a front wall 24, top wall 26, opposed side walls 28, a rear wall 30, and lower wall means 32 (FIG. 3). The top wall 26 has an elongated aperture 31 formed therein, that longitudinally extends substantially parallel to the front wall 24 and includes a ramp-like portion 34 extending downwardly and rearwardly from the front wall 24 to the aperture 1. The lower wall means 32 shown in FIG. 3 is intended to be representative of any suitable means well-known in the art for feeding a document to the platen 16 and holding the document in place thereon during flash illumination. Accordingly, the lower wall means 32 comprises one or more movable or stationary belts, rollers, vacuum headers or plates, or the like, either along or in combination with each other. In addition, the document feeder 20 (FIG. 1) includes a platform 36 which extends from the housing's front wall 24 and below the lower wall means 32, so as to permit a document disposed on the platform 36 to be initially fed by the lower wall means 32, as indicated by the arrow 38 (FIG. 1), to the copier platen 16 for copying purposes, and then fed to and through the aperture 31 (FIG. 1), as indicated by the arrow 40, to the housing's ramp-like portion 34 for retrieval by the operator.

Alternatively, the self-positioning means 10 (FIG. 1) may be combined with platen covering apparatus which simply comprises a suitably-shaped, sheet-like member (not shown), which is made of an opaque material that is impervious to the passage of light therethrough, and which includes a suitable handle rather than the platform 36. Accordingly, in the following discussion the usage of the term document feeder 20 is intended to be generic to platen covering means including such sheet-like members.

The self-positioning means 10 (FIGS. 1 and 2), in accordance with the invention, includes means for hinging the document feeder 20 to the copier 12. The hinge means comprises a pair of oppositely spaced four bar-type linkage systems 44, one of which is shown in FIG. 3. Each of the linkage systems 44 is attached to the document feeder 20, at or near the opposed side walls 28 of the housing 22 and includes a fixed link 46, two lever links 48 and 50, and a connecting link 52. The fixed link 46 comprises an upright, angular stand, which is adapted to be fixedly attached to the copier 20, as by means of a plurality of screws 54, so as to form a part thereof. Each of the lever links, 48 and 50, comprises an elongated member having a U-shaped transverse cross-section. One end of each of the lever links, 48 and 50, is pivotally attached to the fixed link 46, and thus to the copier 20, as by means of the spaced pivot shafts, 56 and 58. The distance between centers of the pivot shafts 56 and 58 defines the length "$L_1$" of the fixed link 46. The connecting link 52 comprises an angular structure fixedly attached to the document feeder 20, as by means of a plurality of screws 60, so as to form a part thereof. The other end of each of the lever links 48 and 50, is pivotally attached to the connecting link 52, and thus to the document feeder 20, as by means of the spaced pivot shafts, 62 and 64, which define the length "$L_2$" of the connecting link 52. The respective lengths "$L_1$" and "$L_2$" of links 46 and 52, and the respective lengths "$L_3$" and "$L_4$" of the lever links 48 and 50, are preferably chosen to ensure that when the document feeder 20 (FIG. 1) is raised above the level of the platen 16 it is disposed in covering relationship with respective to the platen 16 and substantially parallel with respect to the platen 16, throughout the first four to five inches of upward travel of the document feeder 20.

To resiliently elevate the document feeder 20 above the platen 16, the self-positioning means 10 (FIGS. 1 and 3) includes torsion bar means which comprises at least one and preferably two elongated torsion rods 70. Each of the rods 70 includes a mid-portion 72 which lengthwise extends substantially parallel to and in contact with the copier 12. In addition, one end 74 of each of the rods 70 extends axially through one of the opposite lower pivot shafts 58 of a lever link 48 and is bent upwardly, at approximately 90 with respect to the mid-portion 72, so as to extend within and lengthwise parallel to the associated lever link 48. The other end 76 of each of the rods 70 is bent downwardly, at approximately 90 with respect to the mid-portion 72, so as to permit the respective rod ends 76 to be anchored in a slot 78 formed in the copier 12. Assuming the hinge means 44 is fixedly attached to the copier 12 and document feeder 20, the torsion rods 70 are respectively anchored in place in the slot 78 while the document feeder 20 is being held in its maximum position of elevation with respect to the copier 12, so that when the document feeder 20 is released, the respective rods 70 are biased to store energy in the respective torsion rods 70 to cause the torsion rods 70 to urge the lever links 48 clockwise as shown by the arrow 80 (FIG. 3), thereby to elevate the document feeder 20 above the copier 12 and over the copier platen 16.

To augment the resilient forces exerted by the torsion bar rods 70 on the document feeder 20 and to balance the mass of the document feeder 20 at various platen covering levels of elevation, the self-positioning means 10 includes adjustable tension spring means 82 (FIG. 3 and 4) connected to the linkage hinge means 44 to rotate the respective lever links 48 clockwise as shown by the arrow 80 (FIG 3). The tension spring means 82 includes coil springs 84 one of which is associated with each of the linkage systems 44 (FIG. 3). The upper end of each of the coil springs 84 (FIG. 3) is suitably fixedly connected to upper pivot shaft 62 of the associated lever link 48. The lower end of each of the coil springs 84 (FIG. 4) is adjustably fixedly connected to the lower pivot shaft 56 of the associated lever link 50 by means of a U-shaped hook 86, which engages the lower end of the coil spring 84 and is, in turn, threadably engaged by a machine screw 88 extending through an aperture 90 formed in the pivot shaft 56, such that rotation of the machine screw 88 in one direction increases the tension on the coil spring 84 and rotation of the machine screw 88 in the opposite direction decreases tension on the coil spring 84. To lock the machine screw 88 against rotation relative to the hook 86, so as to maintain spring tension at a particular level of tension, there is provided a jam nut 92 for anchoring the machine screw 88 to the pivot 56 and a lock nut 94 for holding the jam nut 92 in place.

When the document feeder 20 is manually urged downwardly against the tension of the torsion rods 70 and spring means 82, and is disposed in the lowermost position thereof as shown in FIG. 1, the document feeder 20 is preferably held in such position by some form of suitable latching means 100 (FIG. 2) connecting the platform 36, and thus the document feeder 20, the copier 12. The latching means 100 preferably comprises a manually movable lever arm 102, which is pivotably attached to the platform 36 by means of a pivot shaft 104 rotatably mounted in a pair of spaced brackets 106 extending from the platform 36. The lever arm 102 spring loaded against manual movement by a coil spring 105 which is mounted on the pivot shaft 104 and has its opposite ends respectively suitably connected to the lever arm 102 and one of the brackets 106. The lever arm 102 includes a cam 108 extending therefrom and disposed so as to engage a cam follower surface 110 formed on a slide block 112. The block 112 is suitably slidably mounted on the platform 36 a by means of a pair of studs 114 extending therefrom. The block 112 is slidably held in place on each of the studs 114, as by means of one or more spring clips 116, and includes a lip portion 118 adapted to engage suitable means, such as finger member 120, fixedly extending from the copier 12. Preferably, the latching means 100 also includes a connecting rod 122 extending from the slide block 112 and across the platform 36 a rocker arm 124, which is pivotably connected to the platform 36 by means of a shaft 126 and movably attached to a second slide block 128 having a lip portion 130 to engage a second finger member 132 fixedly extending from the copier 12.

When the document feeder 20 is located in its lowermost position, as shown in FIG. 1, the respective lip portions 118 and 130, of the respective slide blocks 112 and 128, are disposed in engagement with the associated finger members 120 and 132, so as to hold the document feeder 20 in a predetermined position adjacent to the copier platen 16 for covering the platen and holding respective documents of minimal thickness, such as single sheets of graphic image bearing paper or other sheets of graphic information bearing materials, in contact with the platen 16, to facilitate obtaining high fidelity copies of the graphic information borne by such materials. When it is desired to obtain copies of graphic information borne by non-feedable materials or materials of greater thickness than the aforesaid material of minimal thickness, the operator raises the forwardly extending end of the lever arm 102 (FIG. 2) toward the platform 36. As a result, the lever arm 102 pivots about the shaft 104, against the tension of the coil spring 105, to lower the cam 108 against the slide block's cam follower surface 110; thereby moving the slide block 112 out of engagement with the finger member 120 and moving the connecting rod 122 to the right, as shown in FIG. 2, to also move the slide block 128 out of engagement with the finger member 132. Whereupon, the document feeder 20 is unlatched from the copier 12, as a consequence of which the resilient means, i.e., torsion rods 70 (FIG. 3) and coil springs 84, self-elevate the document feeder 20 above the aforesaid predetermined lowermost position thereof, for covering and holding non-feedable documents of minimal thickness and documents of greater than minimal thickness in contact with the platen 16.

In practice, the torsion rods 70 (FIG. 3) and springs 84 automatically elevate the document feeder 20 to a position wherein it is disposed approximately 2 inches above the platen 16. Whereupon the document feeder 20 may be easily manually raised to a level of about 4½ inches above the platen 16, with the aid of the expanding spring 84 overcoming the friction of the system, to permit respective documents having a thickness within the range of from 2 to 4½ inches to be disposed on the platen 16 and the feeder 20 easily lowered to hold the respective document in contact with the platen 16 for copying purposes. Of course documents of less than 2 inches in thickness may also be loaded on the platen 16 for copying purposes, necessitating the exertion of a little more effort on the part of the operator to lower the document feeder 20 against the combined resilient spring tension of the torsion rods 70 and springs 84. Of course, in the event that the document feeder 20, has been unlatched from the copier 12 to permit a non-feedable sheet of material of minimal thickness to be placed on the platen 16 for copying purposes, the document feeder 16 would be lowered to the aforesaid predetermined minimal position for copying purposes, and therefore latched in place on the copier 12 before the document is copied. Within the range of up to 4½ inches, the torsion rods 70, springs 84 and linkage means 44 coact with each other to self-level the document feeder in covering relationship with respect to the platen 16.

In accordance with the objects of the invention there has been described a simplified form of means for self-positioning the platen covering means of a copier, including apparatus for accommodating different thicknesses of documents placed on platen for copying purposes.

Inasmuch as certain changes may be made in the above described invention without departing from the spirit and scope of the same, it is intended that all matter contained in the above description or shown in the accompanying drawings shall be interpreted in an illustrative rather than the limiting sense. And, it is intended that the following claims be interpreted to cover all the generic and specific features of the invention herein described.

What is claimed is:

1. In a copier including framework and a platen on which respective documents of different thickness may be placed for copying purposes, and means for covering said platen, self-positioning apparatus comprising:
    a. linkage means for movably supporting said covering means, said linkage means adapted to permit movement of said covering means between a predetermined position adjacent to said platen for holding respective documents of minimal thickness in contact with said platen and various positions away from said platen for holding respective documents of greater thickness in contact with said platen;
    b. resilient means for urging said covering means away from said platen, said resilient means including torsion bar means biased to urge said covering means away from said platen, said resilient means including coil spring means cooperative with said linkage means and said torsion bar means for balancing said covering means at respective levels of elevation with respect to said platen; and
    c. latching means for releasably holding said covering means in said predetermined position.

2. The apparatus according to claim 1, wherein said linkage means includes at least four links, one of said links including a portion of said covering means, another of said links being fixedly attached to said framework, and two others of said links being levers.

3. The apparatus according to claim 1, wherein said torsion bar means includes two torsion rods, each of said rods having one end thereof attached to said linkage means and the other end thereof attached to said framework.

4. The apparatus according to claim 1, wherein said coil spring means includes at least one spring connected to said linkage means and means for adjusting said at least one spring.

5. The apparatus according to claim 1, wherein said releasable holding means comprises manually releasable means for holding the covering means in contact with respective minimal thickness documents placed on said platen.

6. Self-leveling apparatus for means for covering the platen of an electrostatic copying machine, said apparatus comprising:
   a. means for supporting said covering means;
   b. means for releasably holding said covering means at a predetermined level with respect to said platen to permit said covering means to cover respective documents of minimal thickness; and
   c. means for resiliently urging said covering means to respective levels above said predetermined level to permit said covering means to cover respective documents of greater thickness, said resilient means including torsion bar means biased when said covering means is disposed in said predetermined position to urge said covering means away from said platen, and said resilient means including tension coil spring means connected to said supporting means and adapted to balance said covering means at respective levels above said predetermined level.

7. The apparatus according to claim 6, wherein said supporting means includes linkage means for hingedly connecting said covering means to said copying machine.

8. The apparatus according to claim 6, wherein said torsion bar means includes a torsion rod, and said tension coil spring means includes a coil spring and means for adjusting the spring tension of said coil spring.

9. In a copier including a means for feeding documents to a platen for copying purposes, self-leveling apparatus for the document feeding means said apparatus comprising:
   a. means for movably supporting said document feeding means,
   b. means for releasably holding said document feeding means at a predetermined level with respect to said platen to permit said document feeding means to feed respective documents of minimal thickness to said platen; and
   c. means for resiliently moving said document feeding means to respective levels above said predetermined level to permit respective non-feedable documents to be disposed on said platen for copying purposes, said resilient means including torsion bar means biased when said document feeding means is disposed in said predetermined position to urge said document feeding means away from said platen.

10. The apparatus according to claim 9, wherein said resilient means includes tension spring means connected to said supporting means and adapted to counterbalance said document feeding means at respective levels above said predetermined level.

11. The apparatus according to claim 9, wherein said supporting means includes linkage means for hingedly connecting said document feeding means to said copying machine for movement with respect thereto.

12. The apparatus according to claim 10, wherein said torsion bar means includes a torsion rod, and said tension spring means includes a coil spring and means for adjusting the spring tension of said coil springs.

* * * * *